United States Patent
Sanichi et al.

(10) Patent No.: US 6,905,990 B2
(45) Date of Patent: Jun. 14, 2005

(54) CERAMIC COLOR COMPOSITION AND METHOD FOR BENDING FLAT GLASS

(75) Inventors: Shigehiro Sanichi, Osaka (JP); Yoshito Nokami, Osaka (JP)

(73) Assignee: Okuno Chemical Industries Co., Ltd., Osaka (JP)

( * ) Notice: Subject to any disclaimer, the term of this patent is extended or adjusted under 35 U.S.C. 154(b) by 216 days.

(21) Appl. No.: 10/312,188

(22) PCT Filed: Dec. 14, 2000

(86) PCT No.: PCT/JP00/08856

§ 371 (c)(1),
(2), (4) Date: Dec. 20, 2002

(87) PCT Pub. No.: WO02/00563

PCT Pub. Date: Jan. 3, 2002

(65) Prior Publication Data

US 2003/0119647 A1 Jun. 26, 2003

(51) Int. Cl.$^7$ ................................................ C03C 1/00
(52) U.S. Cl. .......................... 501/32; 501/32; 501/65; 501/77; 501/79; 65/33.5; 65/60.53; 65/106
(58) Field of Search .............................. 201/16, 32, 65, 201/77, 79, 72; 65/33.1, 33.5, 60.53, 106

(56) References Cited

U.S. PATENT DOCUMENTS 5,208,191 A * 5/1993 Ruderer et al. ............... 501/17
5,578,533 A * 11/1996 Manabe et al. ............... 501/17
5,618,764 A * 4/1997 Usui et al. ..................... 501/17
5,643,636 A * 7/1997 Usui et al. ................. 427/376.2
5,783,507 A * 7/1998 Sakoske ....................... 501/17
5,817,586 A * 10/1998 Harada et al. ................ 501/17
6,105,394 A * 8/2000 Sridharan et al. ............ 65/33.6

FOREIGN PATENT DOCUMENTS

JP   06256039 A  *  9/1994  ............. C03C/8/22
JP   07291659 A  *  11/1995 ............. C03C/8/14

* cited by examiner

*Primary Examiner*—David Sample
(74) *Attorney, Agent, or Firm*—Knobbe, Martens, Olson & Bear LLP

(57) ABSTRACT

The present invention provides a ceramic color composition which comprises, as a solid powder, 50 to 90 wt. % of a mixture containing 5 to 95 parts by weight of a first lead-free glass powder comprising at least $SiO_2$, ZnO, and $B_2O_3$ as glass components, and 5 to 95 parts by weight of a second lead-free glass powder comprising at least $SiO_2$, $Bi_2O_3$, and $B_2O_3$ as glass components, 10 to 40 wt. % of an inorganic pigment, and 0 to 10 wt. % of an inorganic filler.

The composition is free of lead and exhibits an excellent mold release property during the heat-molding process of a glass plate having the composition printed thereon. After firing, the composition is excellent in acid resistance, coloration in the bus bar portion, and plating resistance.

7 Claims, No Drawings

CERAMIC COLOR COMPOSITION AND METHOD FOR BENDING FLAT GLASS

TECHNICAL FIELD

The present invention relates to a ceramic color composition applied to a window glass for automobiles and a simultaneous process for firing the ceramic color composition on a glass plate for coloring and bending the glass plate.

BACKGROUND OF THE INVENTION

Plate glass for automobile windows, such as windshield glass, side window glass, rear window glass, and sunroof glass, is attached to car bodies using an organic adhesive. In order to prevent deterioration of the organic adhesive caused by sunlight, to make the excess portion of the adhesive inconspicuous, and to improve the appearance of the window, the portion (usually, a periphery) of each glass attached to a car body is colored in black or dark gray by screen printing (coating) a ceramic color paste composition and firing.

Usually, automobile window glass is manufactured by screen printing a paste form ceramic color composition in the manner as described above on the periphery of a flat glass (glass plate), which has been cut into a predetermined shape, and then subjecting it to a molding process or a tempering process by heating. Among the types of window glass, side window glass, rear window glass, and sunroof glass are usually bended by forcibly pressed in a press-mold.

Therefore, the ceramic color composition is primarily required to have an excellent mold release property during the formation process in view of the above feature of the manufacturing process. This is because the shape of the glass is defined by the mold having ceramic paper, glass fiber cloth, stainless steel cloth or the like on its surface, and the mold and the periphery of the glass plate to which the ceramic color composition is applied are kept in constant contact with each other. The use of a ceramic color composition having a poor mold release property adversely affects the dimensional stability, and, in an especially troublesome case, the glass plate cannot be removed from the mold. This inevitably interrupts the manufacturing operation and significantly lowers the productivity. This is a very serious problem.

One of the other properties required of the ceramic color composition is an acid resistance of the fired color. The ceramic color fired onto a glass plate for use in an automobile may be whitened by being exposed to acid rain or the like during long-term use, especially in areas on the glass plate where rain accumulates without readily flowing off. In order to prevent this phenomenon, the ceramic color must have an acid resistance higher than a predetermined level.

Furthermore, in almost all cases, silver paste is fired onto the rear window glass to serve as preventing fogging or an antenna, and the areas where the electrodes of the silver electric circuit are extended (bus bar portion) are printed in a wide area onto the ceramic color. However, in some cases, silver in the silver paste reaches the glass plate surface by migrating through the ceramic color layer. Such migration of silver causes irregular coloration of white, yellow, blue, green, etc., on the glass plate, adversely affecting its appearance. The irregular coloration is greatly affected by the ratio of the glass components of the ceramic color, and the ceramic color is preferably required such that it can develop a color even on a dark amber color.

The above-described silver circuit also functions as electric resistance when an electric current is sent thereto, and, by generating heat, exhibits an antifogging effect. However, its electric resistance may become too high depending on its design and cause overheating. To prevent overheating, electrolytic copper plating and electrolytic nickel plating are commonly applied to the silver circuit. The bath used for this electrolytic copper plating is strongly acidic. Therefore, the ceramic color must be able to withstand such a plating bath. In other words, the ceramic color is required to have a property that prevents its external appearance from being degraded when it is dipped into the bath and a current is applied during the electrolytic copper plating process. Furthermore, the ceramic color should have a property such that the adhesiveness of the plated film is not lowered when terminals are soldered thereon. The properties required of the ceramic color as described above also vary depending on the ratio of the glass components of the ceramic color.

Heretofore, to meet each requirement in the property of the ceramic color as described above, several recipes that are effective to some degree have been proposed. For example, the mold release property can be improved by using PbO—$SiO_2$—$B_2O_3$ based glass, which has relatively strong acid resistance, and adding a large volume of inorganic pigments and inorganic fillers, which will not melt during the heating process, or by lowering the fluidity of the ceramic color during the molding process by changing the glass components so as to make them crystallizable during the heating process. With regard to acid resistance, coloration in the bus bar portion, and resistance to plating solutions, in most cases, it is possible to obtain the required properties by using the above-described PbO—$SiO_2$—$B_2O_3$ based glass in a similar manner (for example, Japanese Unexamined Patent Publication No. 1991-285844 (Japanese Patent No. 2748647), Japanese Unexamined Patent Publication No. 1993-85770, and Japanese Unexamined Patent Publication No. 1994-239647).

However, in recent years, prompted by the trend to be environmentally friendly, severe legal controls have been imposed on the use of not only cadmium but also lead and lead compounds. Accordingly, there have been strong demands to stop using or reduce the amount of lead contained in the ceramic color. In order to meet these demands, several kinds of research and development have been conducted to obtain a lead-free glass composition to replace the known PbO—$SiO_2$—$B_2O_3$ based glass.

Specific examples include Japanese Unexamined Patent Publication No. 1996-133784 and Japanese Unexamined Patent Publication No. 1999-157873, which disclose crystalline ZnO—$SiO_2$—$B_2O_3$ based glass compositions. Such compositions generally meet the requirements in the mold release property, coloration in the bus bar portion, and acid resistance. However, they have a drawback in that the adhesive strength of the soldered terminals is significantly reduced and peeling-off occurs at the interface between the silver coating and the ceramic color during adhesive strength measurements.

Japanese Unexamined Patent Publication No. 1994-234547, Japanese Unexamined Patent Publication No. 1995-144933, Japanese Unexamined Patent Publication No. 1996-34640, Japanese Unexamined Patent Publication No. 1997-227214, etc., disclose $Bi_2O_3$—$SiO_2$—$B_2O_3$ based glass. By selecting the composition for crystallization, such types of glass exhibit a satisfactory mold release property, and, to some extent, strong resistance to a plating solution, and acid resistance. However, such types of glass are disadvantageous in that they always have undesirable yellow or blue coloring on the bus bar portion. In addition, they have a drawback such that, when they are fired with a black pigment added, the shade of black seen through the glass is too weak and appears grayish, and this adversely affects its beauty of appearance and other design-related characteristics.

Japanese Unexamined Patent Publication No. 1998-87340 discloses a $ZnO$—$Bi_2O_3$—$SiO_2$—$B_2O_3$ based glass composition. This type of glass has fine coloration in the bus bar portion, strong resistance to plating solutions, and sufficient acid resistance. However, it has an inferior mold release property because of the lowered crystallinity. The inventors conducted an additional examination and verified that the above-described group of glass (crystallizable) can deposit crystals based on either zinc or bismuth. However, it is difficult to deposit both crystals at the same time. Furthermore, even when crystals of either zinc or bismuth are deposit, the amount is insufficient and the desired mold release property cannot be obtained.

Table 1 shown below summarizes the-above explanation. Note that each glass listed in Table 1 is crystalline, and, in the table, "A" indicates that a satisfactory result was obtained regarding the properties required of the ceramic color for use in automobile window glass, especially, in the rear window glass, and "B" indicates that a satisfactory result was not obtained.

TABLE 1

| Type of Glass | Properties | | | |
|---|---|---|---|---|
| | Mold release property | Acid resistance | Resistance to metal plating solution | Coloration in the bus bar portion |
| $ZnO$—$SiO_2$—$B_2O_3$ | A | A | B | A |
| $Bi_2O_3$—$SiO_2$—$B_2O_3$ | A | A | A | B |
| $ZnO$—$Bi_2O_3$—$SiO_2$—$B_2O_3$ | B | A | A | B |

As shown in the table, several lead-free ceramic color compositions have been proposed. However, these ceramic color compositions are still deficient in one or more properties required to the ceramic color of this kind. Heretofore, there has been no ceramic color composition developed, that meets all of the required properties.

DISCLOSURE OF THE INVENTION

An object of the present invention is to provide a ceramic color composition to replace the heretofore used lead containing ceramic color for use in automobile window glass.

Another object of the invention is to provide a ceramic color composition that completely overcomes various drawbacks observed in the heretofore used lead-free ceramic color of this kind and that has excellent quality, with all of the required properties of a ceramic color.

Specifically, the object of the invention is to provides a lead-free ceramic color composition that exhibits an excellent mold release property during the hot molding process of a glass plate having a paste of the ceramic color composition printed thereon, and, after firing, that obtains excellent acid resistance, coloration in the bus bar portion, resistance to plating solutions, and the like.

Still another object of the present invention is to provide a method to manufacture automobile window glass by bending the glass plate containing the improved lead-free ceramic color composition.

In order to achieve the above-described objects, the inventors variously altered the ratio of the glass components of the heretofore-proposed lead-free ceramic color compositions. However, only altering the ratio of the glass components thereof could not attain the above-described objects. Then, the inventors made a new finding, i.e., that a ceramic color composition meeting the above-described objects can be obtained when a specific zinc-containing glass powder and bismuth-containing glass powder are mixed in a predetermined ratio, especially when a crystalline glass powder is used in at least one of the two. The invention was completed based on the above finding.

The present invention provides a ceramic color composition, which comprises, as a solid powder, 50 to 90 wt. % of a mixture containing 5 to 95 parts by weight of a first lead-free glass powder comprising at least $SiO_2$, ZnO and $B_2O_3$ as glass components, and 5 to 95 parts by weight of a second lead-free glass powder comprising at least $SiO_2$, $Bi_2O_3$ and $B_2O_3$ as glass components, 10 to 40 wt. % of an inorganic pigment, and 0 to 10 wt. % of an inorganic filler.

The invention also provides a ceramic color composition, wherein at least one of the first glass powder and the second glass powder is crystalline; wherein the first glass powder and the second glass powder have glass components as described below (including both the case where the second glass powder is amorphous and the case where the second glass powder is crystalline); and wherein the second glass powder is a crystalline glass powder having the ratio of the components (wt. %) as described below.

First Glass Powder:

| Ratio of the component (wt. %) | |
|---|---|
| $SiO_2$ | 35–50 |
| $B_2O_3$ | 1–9 |
| ZnO | 15–40 |
| $TiO_2$ | 0.5–10 |
| $Li_2O$ | 0.1–10 |
| $Na_2O$ | 0.1–10 |
| F | 0–5 |
| $K_2O$ | 0–10 |
| $ZrO_2$ | 0–5 |
| $V_2O_5$ | 0–5 |

Second Glass Powder:

| | Ratio of the component (wt. %) | |
|---|---|---|
| | (Amorphous or Crystalline) | (Crystalline) |
| $SiO_2$ | 15–40 | 20–35 |
| $B_2O_3$ | 1–12 | 1–8 |
| $Bi_2O_3$ | 40–70 | 50–65 |
| $TiO_2$ | 1–10 | 1–10 |
| $Li_2O$ | 0.1–10 | 0.1–10 |
| $Na_2O$ | 0.1–10 | 0.1–10 |
| $K_2O$ | 0–10 | 0–10 |
| $ZrO_2$ | 0–5 | 0–5 |
| $V_2O_5$ | 0–5 | 0–5 |
| F | 0–5 | 0–5 |

The invention further provides a method for bending a glass plate which comprises printing a paste of ceramic color composition on a glass plate, applying pressure to the glass plate with a mold under heat, and firing the paste thereon and bending the glass plate at the same time. The invention also provides a glass plate obtained by the above-mentioned method, particularly, a glass plate for use in automobile window glass.

Hereinafter, the ceramic color composition of the invention will be explained in detail. Generally, a ceramic color composition is in a form suitable for coating or printing an inorganic pigment powder, an inorganic filler powder, and a glass powder onto a glass material. To be more specific, a ceramic color composition is in the form of a paste obtained by dispersing it in a resin solvent solution (organic vehicle), or in the form of paint. When the ceramic color composition is applied and fired on the glass material, the organic substances contained therein decompose and dissipate, leaving no trace of the organic substances in the fired coating film. In the present specification, the inorganic powder mixture obtained by removing the organic vehicle from the ceramic color composition is referred to as a "solid component" or a "solid powder." Unless otherwise described, the unit % found below indicates % by weight.

The solid powder composing the ceramic color composition of the invention comprises a mixture of specific glass powders, an inorganic pigment, and an inorganic filler. By heating the ceramic color composition containing the solid component on the glass material at a relatively high temperature (but not so high that the glass material melts), the glass powder (mixture) in the solid component melts, developing a color and forming a film by moistening the inorganic pigment and the inorganic filler. The glass powder also fuses with the glass material at their interface and strongly adheres to the glass material.

The inorganic pigment powder is defined as a powder in which various kinds of colored metal compounds or the like are used singly or in combination, and which forms a colored film when mixed with the glass powder and fired. On the other hand, the inorganic filler is a powder of metal oxide or the like, which is not colored itself and which regulates the properties or the like of the fired film by being mixed and fired with the glass powder.

In the ceramic color composition of the invention, it is important to mix and use the specific two kinds of glass powders (first glass powder and second glass powder). Here, the first glass powder is a lead-free powder that contains, as glass components, at least $SiO_2$, $ZnO$, and $B_2O_3$, and the second glass powder is a lead-free powder that contains, as glass components, at least $SiO_2$, $Bi_2O_3$, and $B_2O_3$.

It is also important that at least one of the two kinds of glass powders is crystalline. Especially, it is preferable that the first glass powder be an essential crystalline glass powder. This is because the degree of crystallization can be adjusted relatively easily and a high degree of crystallization can be readily obtained by adjusting the ratio of the glass components of the first glass powder.

The first glass powder is preferably has the following features in regard to the ratio of the glass components.
(1) Regarding the ratio between $SiO_2$ and $ZnO$, the content of $SiO_2$ is greater. Particularly, the ratio of $ZnO$ to $SiO_2$ is in the range of 0.5–1 (weight ratio).
(2) The content of $B_2O_3$ is as low as 1–9%.
(3) $TiO_2$ is contained at a proportion of 0.5–10%.

The ratio of the components of the first glass powder is preferably selected from the following ranges:
$SiO_2$ 35–50%, $B_2O_3$ 1–9%, $ZnO$ 15–40%, $TiO_2$ 0.5–10%, $Li_2O$ 0.1–10%, $Na_2O$ 0.1–10%, F 0–5%, $K_2O$ 0–10%, $ZrO_2$ 0–5%, and $V_2O$ 0–5%.

The first glass powder is excellent particularly in acid resistance, mold release property, coloration in the bus bar portion, etc. In other words, the first glass powder deposits crystals of $2ZnO.SO_2$ during heating, and this improves the mold release property during the hot molding process of the glass plate. When the crystallization ratio of this crystal becomes high, the mold release property improves (on the other hand, the acid resistance decreases).

The content of each glass component composing the first glass powder and the effects on the properties of the first glass powder will be described below in detail.

The $SiO_2$ component serves as a network-former for the glass, and it is also essential as a crystallizing component. If the content of $SiO_2$ is far less than 35%, the acid resistance and the mold release property are lowered. If the content of $SiO_2$ becomes so high as to exceed 50%, firing at the glass plate formation process (bending process) becomes incomplete. The most preferable range for $SiO_2$ content is 38–47%.

The $B_2O_3$ component is an essential component for vitrification, and has the effect of lowering the softening temperature of the glass without raising the coefficient of glass expansion. If the content of $B_2O_3$ becomes so high as to exceed 9%, the acid resistance and the mold release property are lowered. The most preferable range for $B_2O_3$ content is 3–8%.

The $ZnO$ component has the effect of lowering the softening temperature of the glass and becomes a crystal component, and therefore it is an essential component of the glass of the invention. Having a $ZnO$ content of far less than 20% raises the softening temperature of the glass and lowers the rate of crystallization. Having a $ZnO$ content so high as to exceed 40% lowers the acid resistance. Therefore, it is most preferable that the content of $ZnO$ be in the range of 25–35%.

By adding the $TiO_2$ component, the acid resistance of the glass is enhanced; however, when its content becomes so high as to exceed 10%, the softening temperature becomes high and firing may become impossible. It is most preferable that the content of $TiO_2$ be in the range of 2–7%.

The $Li_2O$ component and $Na_2O$ component are preferably added as alkaline components. Adding these components has the effect of lowering the viscosity of the glass during the softening process, and promoting the crystallization of the glass. Generally, if the total content of the $Li_2O$ component and $Na_2O$ component is less than 0.2%, the softening point of the glass becomes too high, and if its content exceeds 20%, the coefficient of thermal expansion becomes excessively large, and this tends to reduce the strength of the glass plate.

The F component generally is effective in lowering the softening temperature of the glass and promoting crystallization by adding a small amount thereof in the form of NaF. If the content becomes so high as to exceed 5%, the acid resistance is lowered.

The $K_2O$ component is not essential, but it can achieve effects similar to those of the $Li_2O$ component and $Na_2O$ component.

Adding the $ZrO_2$ component improves the alkali resistance, but if its content exceeds 5%, it causes a rapid rise in the softening temperature of the glass, thus being undesirable.

Adding a small amount of the $V_2O_5$ component functions to lower the softening point of the glass. If the content becomes so high as to exceed 5%, the acid resistance of the glass is lowered.

In addition to the above-described components, the first glass powder of the invention may be further blended with, for example, CaO, MgO, BaO, SrO, $Al_2O_3$ and the like. The proportion of the total amount of the blended components is preferably less than 5%. Adding these components allows fine adjustments to be made to the coefficient of expansion, improving the acid resistance, adjusting the rate of crystallization, etc.

The ratio of the components used as the second glass powder of the invention is preferably selected from the range as listed below.

$SiO_2$ 15–40%, $B_2O_3$ 1–12%, $Bi_2O_3$ 40–70%, $TiO_2$ 1–10%, $Li_2O$ 0.1–10%, $Na_2O$ 0.1–10%, $K_2O$ 0–10%, $ZrO_2$ 0–5%, $V_2O_5$ 0–5%, and F 0–0.5%. These ranges include the cases where the glass powder is amorphous and where it is crystalline.

In the above ranges, the ratio of the components where the second glass powder is crystalline is selected from the following.

$SiO_2$ 20–35%, $B_2O_3$ 1–8%, $Bi_2O_3$ 50–65%, $TiO_2$ 1–10%, $Li_2O$ 0.1–10%, $Na_2O$ 0.1–10%, $K_2O$ 0–10%, $ZrO_2$ 0–5%, $V_2O_5$ 0–5%, and F 0–5%. Especially, it is preferable that the ratio (weight ratio) of $SiO_2$ to $Bi_2O_3$ be in the range of 0.3–0.7 and the total amount of $SiO_2$ and $Bi_2O_3$ be 75–95%. It is also preferable that the proportion of the total amount of the alkaline components ($Li_2O$, $Na_2O$) be 2% or greater.

The contents of each glass component composing the second glass powder and the effects on the properties of the second glass powder will be described below in detail.

$SiO_2$ is an essential component as a glass network-former. If its content becomes far less than 15%, the acid resistance is lowered. If its content is so high as to exceed 40%, firing in the glass plate formation process (bending process) becomes poor. In crystallized glass, $SiO_2$ functions as a crystallizing component.

$B_2O_3$ is an essential component, and has the effect of lowering both the softening temperature of the glass and the coefficient of linear expansion. If its content becomes so high as to exceed 12%, it significantly lowers the acid resistance. In crystallized glass, the content of $B_2O_3$ is preferably in the range of 1–8% to obtain an excellent mold release property.

$Bi_2O_3$ is also an essential component, and has the effect of lowering the softening temperature of the glass. If the $Bi_2O_3$ content is far less than 40%, the softening temperature of the glass is raised, thus being undesirable. If the $Bi_2O_3$ content becomes so high as to exceed 70%, it lowers the acid resistance, and the coefficient of linear expansion rises to above $90 \times 10^{-7}$. In crystallized glass, $Bi_2O_3$ functions as a crystallizing component.

Adding the $TiO_2$ component enhances the acid resistance. However, if its content exceeds 10%, the softening temperature is raised and crystals containing $TiO_2$ are deposited. This tends to result in a whitish tone after firing.

The $Li_2O$ component and $Na_2O$ component are preferably added as alkaline components. Adding these components is effective for lowering the softening temperature of the glass and promoting crystallization in crystallized glass. Generally, having the total content of the $Li_2O$ component and $Na_2O$ component be less than 0.2% makes the softening point of the glass too high, and a content exceeding 20% makes the coefficient of thermal expansion excessively large, tending to reduce the strength of the glass plate.

The F component generally has the effect of lowering the softening temperature of the glass by adding a small amount thereof in the form of NaF. If its content exceeds 5%, the acid resistance is lowered.

$K_2O$ is not an essential component, but it can achieve effects similar to those of the $Li_2O$ component and $Na_2O$ component.

Adding the $ZrO_2$ component improves the water resistance and alkali resistance, but if the content becomes so high as to exceed 5%, it causes a rapid rise of the softening temperature of the glass, thus being undesirable.

Adding a small amount of the $V_2O_5$ component lowers the softening temperature of the glass. If the content becomes so high as to exceed 5%, the acid resistance of the glass is significantly lowered.

Similar to the first glass powder, in addition to the above-described components, the second glass powder of the invention may be further blended with, for example, CaO, MgO, BaO, SrO, $Al_2O_3$ and the like. The proportion of the total amount of the blended components is preferably less than 5%. Adding these components allows fine adjustments to be made to the coefficient of expansion, improving the acid resistance, adjusting the rate of crystallization, etc.

In the invention, the ratio of the first glass powder to the second glass powder (the first glass powder/the second glass powder) is selected from the range 5/95 to 95/5 (weight ratio). Using the first glass powder together with the second glass powder complements the drawbacks that appear when each is used solely. This makes it possible to obtain a ceramic color that has all of the properties, including mold release property, acid resistance, metal plating resistance, and coloration in the bus bar portion at the level expected in the invention. However, if the ratio of the two glass powders falls in outside of the above-mentioned range, it becomes difficult to obtain the above-explained effects by the combined use of the two glass powders, thus being undesirable.

Note that, as the first glass powder and the second glass powder, one or more glass powders belonging to each type of glass powder can be selected and used. Especially, when two or more types of glass powders are used, it is possible to adjust the after-processing strength of the glass, which is attributable to its softening point, mold release property, and linear thermal expansion coefficient, thus making it more advantageous.

The first glass powder and the second glass powder can each be manufactured by the conventional manner. For example, each ingredient of the batch material is mixed in the amount such that they form the above-described appropriate constituents when melted, obtaining a batch composition. The composition is melted at a temperature of about 1,000° C. or higher, generally in the range of 1,100–1,300° C., and the melt is quenched in water to obtain popcorn-like glass or inserted to water-cooling rollers to obtain flake-like glass. Then, the resultant glass is subjected to wet grinding, for example, using alumina balls in a ball mill, etc. The resultant slurry is dried in a drying machine and made into a cake form, and thereafter crushed into a powder using a sieve or grinder. It is also possible to directly make the resultant slurry into powder using a spray drier or the like.

The first glass powder and second glass powder thus obtained have a grain size of generally around 0.1–30 $\mu$m, and preferably around 0.5–20 $\mu$m. If coarse particles having a grain size exceeding 30 $\mu$m exist, it is preferable that these particles be removed by using, for example, an air flow-type classifying apparatus, a sieve, etc.

In the invention, a mixture of the first glass powder and the second glass powder can be obtained by the following conventional manner. For example, the mixture can be obtained by putting both kinds of glass powders in predetermined amounts into a blender together with an inorganic pigment and inorganic filler. It is also possible to mix both kinds of glass in the form of popcorn-like glass or flake-like glass obtained in the glass powder manufacturing process described above, then pulverize the resultant glass mixture, obtain a predetermined powder-form glass, and subsequently mix the predetermined amounts of the glass with an inorganic pigment and inorganic filler. It is particularly preferable that the former method be employed in diverse, small-lot production lines, wherein the formula of the ceramic color composition is adjusted depending on the part of the glass plate in an automotive used and the processing methods. The latter method is suitably applied to prepare a ceramic color composition, which is used in a large volume for a single purpose.

The solid component of the ceramic color composition of the invention is prepared by adding a predetermined amount of inorganic pigment and inorganic filler to a predetermined amount of a mixture of a first glass powder and second glass powder.

Here, as an inorganic pigment, it is possible to use the same pigments that were heretofore used with this kind of ceramic color. Specific examples of inorganic pigments include $CuO.Cr_2O_3$ (black), $CoO.Cr_2O_3$ (black), $Fe_2O_3$ (brown), $TiO_2$ (white), $CoO.Al_2O_3$ (blue), $NiO.Cr_2O_3$ (green), etc., and their combination.

The inorganic pigment is contained in the composition (solid component) of the invention generally in the range of around 10–40%, and preferably around 15–35%. If the content is less than 10%, the resultant fired film has insufficient concealing ability. Accordingly, it does not satisfactorily serve the original purpose of the ceramic color, i.e., blocking sunlight. On the other hand, a content exceeding 40% inevitably reduces the proportion of glass and results in poor film formation during the firing process (the film becomes porous), leading to a defect such that adhesion primer permeates into the glass plate surface during the adhesion process. The inorganic pigment can be advantageously used in a commercially available powder form in the present invention. The particle size is not limited and generally in the range of about 0.1–1 μm.

The inorganic filler used in the invention is selected from all kinds of inorganic fillers generally known to be usable with this kind of ceramic color composition, especially, from among those that do not melt at high temperatures. Specific examples of inorganic fillers include metal oxides such as alumina, silica, zircon, zircon silicate, zinc oxide, and the like, which control the fluidity of the ceramic color when heated to a high temperature and promote the improvement of the mold release property particular to crystallized glass (preventing color from adhering to the glass mold), and powders with an especially low expansion property, such as β-eucryptite, β-spodumene, cordierite, molten silica, and the like, which control the coefficient of linear expansion of the ceramic color.

There is no limitation on the particle size of the inorganic filler. Taking into consideration that the original effect of the filler is greatly attributable to its grain surface area, it is more desirable that the particle size be small. However, if the particle size is too small, it will raise the adhesion temperature of the ceramic color, thus being disadvantageous. The particle size is generally selected from the range of around 0.05–30 μm, and preferably in the range of around 0.1–20 μm. The ratio to the composition (solid component) of the invention is generally less than 10%, and preferably less than 7%. If this ratio exceeds 10%, the adhesion temperature of the ceramic color becomes too high, causing problems such as incomplete adhesion to the base glass, permeation of primer during the adhesion process, etc. Note that the inorganic filler is not essential if its purposes are fulfilled by selecting the kinds and ratio, etc., of the other components described above, or if the characteristics of a glass powder having a low melting point overcome the problems that the filler aims to solve. For example, if the mold release property is fully satisfactory by using only crystalline glass as the glass powder mixture, it is not necessary to add an inorganic filler to improve the mold release property. If a desirable coefficient of linear expansion can be obtained by blending the glass powder with an inorganic pigment, it becomes unnecessary to add an inorganic filler to adjust the coefficient of linear expansion.

Generally, the ceramic color composition of the invention contains the glass powder mixture, inorganic pigment and inorganic filler in a predetermined ratio as its solid component, and the mixture is prepared into a form suitable to coat, print or the like onto a glass material. To be more specific, a ceramic color composition is prepared into a paste or paint form dispersed in a solvent solution of resin (organic vehicle).

The solvent solution (organic vehicle) of the resin used here is not particularly different from that of the generally used ceramic color composition of this type, and it can be obtained by dissolving a flammable resin in a solvent. Specific examples of the flammable resin preferably used include cellulose resin, acrylic resin, methacrylate resin, butyral resin, and vinyl pyrrolidone resin, which have excellent thermal decomposition effects. As a solvent, for example, pine oil, α-terpineol, butyl Carbitol™, butyl Carbitol™ acetate, propylene glycol or the like, which have a relatively high boiling point, can be used.

Generally, a paste is preliminarily dried by a conventional method before performing firing and bending in the molding process. Instead of the above-described organic vehicles, for example, ultraviolet ray curable type oligomers of acrylate, methacrylate, and the like can be prepared by incorporation of a photopolymerization initiator and used as a vehicle component, producing an ultraviolet ray curable type paste. This makes it possible to form a predetermined film by exposing it to ultraviolet rays instead of conducting the above-described preliminary drying. In both cases, it is preferable that the viscosity of the paste be suitably adjusted to perform screen printing, i.e., generally, in the range of about 1,000–10,000 Pa·s.

The ratio of the organic vehicle to the solid component and the proportion between the resin and solvent added to the vehicle are not limited and can be suitably selected depending on the form of the resultant composition, and, particularly, the method for applying the composition to the glass plate. For example, when the composition is prepared into a paste suitable for screen printing, etc., generally, it is preferable to use an organic vehicle in the range of 10–40 parts by weight per 100 parts by weight of the solid component. When the composition is prepared into a painting form, it is preferable to use an organic vehicle in the range of 30–100 parts by weight per 100 parts by weight of the solid component. The composition can be prepared into several forms in a conventional manner, for example, dispersing the solid component in the organic vehicle using a roll mill, sand mill, ball mill, or the like.

The ratio of the resin and solvent added to the organic vehicle is not limited and can be selected arbitrarily. Generally, it is preferable that the amount of resin used be selected from the range of about 5–50 parts by weight per 100 parts by weight of solvent.

The thus obtained paste, paint or other form of ceramic color composition of the invention can be applied to a glass plate and subjected to the automobile window glass manufacturing process (bending process) by following the generally known methods. For example, the composition can be applied to the periphery of the glass, which has been cut into a predetermined shape. The application method is not different from conventional methods, and, for example, the screen printing method, spray painting method, roll coater method, etc., can be employed. The screen printing method is the simplest and is suitable for partial application.

The glass plate to which the ceramic color composition (in the form of a paste or the like) is coated is dried once and the silver paste that will function as a heating wire is printed thereon. The glass plate is further dried and subjected to tempering and bending processes.

Currently, as the process to form automobile window glass, including sunroof glass, rear window glass, and side window glass, the following methods are generally employed, i.e., a process in which the bending step is performed with the glass plate pressed between two molds, and a process in which the glass plate is bent in a furnace by drawing it into a mold with vacuum suction. These molding processes comprise the steps of preheating in a tunnel kiln generally having a temperature from ordinary temperature to around 660° C., and bending in a batch type furnace at 640–720° C. This is because, if the ceramic color is fired on the glass plate and crystallized during the preheating step, the ceramic color will not adhere to the mold when it comes into contact with the mold during the subsequent bending step, since it is already crystallized and does not have fluidity (the glass viscosity does not lower).

A glass plate to which the ceramic color composition of the invention is applied may, of course, be subjected to the molding process comprising the above described two steps; however, the ceramic color composition of the invention itself has an improved mold release property compared to the ceramic color composition of the prior art, and therefore a glass plate having the ceramic color composition of the invention applied does not have to be subjected to the above mentioned two steps and can be processed under a less severe environment. For example, the glass plate can be sufficiently bent by a bending process conducted outside a furnace, such as a suspension and pressure (press) method, a pressure (press bend) method or the like, to manufacture the desired automobile window glass.

The thus obtained colored portion having the ceramic color composition of the invention fired on a glass plate exhibits excellent acid resistance, sufficient color developing characteristics on the silver bus bar portion, and color tone with a good appearance. Furthermore, the ceramic color composition of the invention has a proper coefficient of thermal expansion, and any reduction in the strength of the glass plate having the color fired thereon is minimized. Therefore, for example, when the glass plate is used as an automobile window and injection molding of a plastic is carried out on its periphery, it is advantageous in that glass breakage can be prevented.

BEST MODE FOR CARRYING OUT THE INVENTION

The present invention will be described below in more detail with reference to the examples.

EXAMPLES 1–6 AND COMPARATIVE EXAMPLES 1–6

(1) Preparation of Solid Powders

Batches containing mixtures of materials having components in the amounts shown in Tables 2 to 6 to form lead-free glasses were melted at a temperature in the range of 1,200–1,250° C. Then, popcorn-like glass was obtained by rapidly cooling the molten glass in water. The thus obtained types of glasses were subjected to wet grinding using alumina balls in a ball mill, and the resultant slurries were dried and made into dry cakes. The dry cakes were further crushed into powders using a sieve to prepare glass powders. The average particle diameter ($D_{50}$) of the obtained powders was 2.8 μm.

Two kinds of glass powders (as in Examples 1–6), one kind of glass powder (as in Comparative Examples 1–4), or two kinds of glass powders (as in Comparative Examples 5 and 6) prepared as described above were mixed with a predetermined amount of inorganic pigment or further blended with an inorganic filler to prepare solid powders. In Comparative Examples 5 and 6, the ratios of the first glass powder and the second glass powder were outside the range defined in the invention.

Note that "Zn based crystal" in the rows titled glass components in the tables indicates $ZnO$—$SiO_2$—$B_2O_3$ based crystallized glass, and "Bi based crystal" and "Bi based amorphous" indicate $Bi_2O_3$—$SiO_2$—$B_2O_3$ based crystallized and amorphous glass, respectively. "Zn, Bi based crystal" (Table 5, Comparative Example 4) indicates $ZnO$—$Bi_2O_3$—$SiO_2$—$B_2O_3$ based crystallized glass containing both ZnO component and $Bi_2O_3$ component in a single glass.

In each example, as an inorganic pigment, a black pigment ($CuO.Cr_2O_3$, manufactured by Asahi Kasei Kogyo Co. Ltd.; product No. 3700) was used. As inorganic fillers, those indicated in the tables (all of which are commercially available) were prepared by pulverizing into a particle size of 0.1–3.0 μm.

(2) Preparation of the Ceramic Color Composition

To the solid powder prepared in Item (1) described above (100 parts by weight), 30 parts by weight of the organic vehicle (viscosity: 100 Pa·s (measured using a BL model viscometer, rotor No. 3, speed: 12 rotation, temperature: 25° C.)), which consisted 93% pine oil, 4% ethyl cellulose (manufactured by Dow Chemical Company, product No. STD-20), and 3% isobutyl methacrylate resin (ELVACITE, Manufactured by Du Pont Company, product No. 2045), was added and dispersed by a triple roller. Thus a ceramic color paste having a viscosity of 3,000–3,500 Pa·s was prepared.

TEST EXAMPLE 1

Mold Release Property:

The ceramic color compositions in paste form obtained in the Examples and Comparative Examples were each printed onto the entire surface of a glass plate (37 mm×50 mm×3.5 mm) using a 150 mesh polyester (Tetron™) screen, and dried to obtain test pieces.

One of the test pieces and a mold substitute were placed side by side onto a quartz glass plate covered with ceramic wool. The mold substitute was obtained by wrapping stainless steel cloth around the quartz glass plate that has the same size as the test piece, with no looseness. The test piece and mold substitute placed side by side on the quartz glass plate were fired for three minutes in a furnace that was preheated to 640–700° C. They were then removed from the furnace, the mold substitute was immediately pressed onto the surface of the test piece with ceramic color applied, and the test piece and mold substitute were fired again at the same temperature for 2 minutes, and taken from the furnace. As soon as the test piece and mold substitute were taken from the furnace, the mold substitute was slowly lifted from the test piece, and the conditions observed were graded based on the five criteria given below. Using this as an index, the mold release property was evaluated.

In the tests conducted using the composition of the invention, the firing temperature was set at 680° C. This temperature is considered to be a severe condition for obtaining an acceptable mold release property.

A: The mold substitute can be removed from the test piece without resistance.

B: The mold substitute can be removed from the test piece with slight resistance.

C: The test piece adheres to the mold substitute, but is removed from the mold substitute when lifts.

D: The test piece adheres to the mold substitute, but is removed from the mold substitute when lifts and vibrates.

E: The test piece adheres to the mold substitute and cannot be removed even lifts and vibrates.

The test pieces in categories A to C are usable.

TEST EXAMPLE 2
Acid Resistance:

The ceramic color compositions in paste form obtained in the Examples and Comparative Examples were each printed into a pattern onto an area of 30 mm×60 mm on the surface of a glass plate (50 mm×75 mm×3.5 mm) using a 150 mesh polyester (Tetron™) screen, and fired at 660° C. for 4 minutes, to obtain test pieces.

The thickness of the ceramic color film of the test piece was measured using a measuring apparatus (SURFCOM 300B manufactured by TOKYO SEIMITSU CO., LTD.), and the test pieces having a thickness of 20 μm±1 μm were subjected to the following tests.

A sulfuric acid solution with a concentration of 0.1 N was prepared in an airtight container, and the above described test pieces were immersed into this solution at 80° C. for a predetermined period. The interface between the ceramic color and the glass was then observed from the surface on which no ceramic color was printed. The immersion time until slight whitening appeared was measured and categorized into the following four criteria for measuring the acid resistance of the ceramic color. Based on the following standard, the acid resistance of the ceramic color was evaluated:
1: No whitening appears for 48 hours or more.
2: Whitening appears within the range of 20–48 hours.
3: Whitening appears within the range of 5–20 hours.
4: Whitening appears within 5 hours.

TEST EXAMPLE 3
Coloration in the Bus Bar Portion

The ceramic color compositions in paste form obtained in the Examples and Comparative Examples were each printed into a pattern onto an area of 30 mm×60 mm on the surface of a glass plates (50 mm×75 mm×3.5 mm) using a 150 mesh polyester (Tetron™) screen and dried. A silver paste (product number 8060 Manufactured by E. I. du Pont de Nemours and Company) was printed into a pattern onto an area of 10 mm×70 mm on the surface thereof using a 230 mesh polyester (Tetron™) screen. After drying, firing was performed for four minutes at 660° C., to obtain test pieces.

The thickness of the ceramic color film of the test piece was measured using a measuring apparatus (SURFCOM 300B manufactured by TOKYO SEIMITSU CO., LTD.), and the test pieces having a thickness of 20 μm±1 μm were subjected to the following tests.

The interface between the ceramic color and glass was observed from the surface on which no ceramic color was printed to determine the coloration level in the bus bar portion in the area on which the silver paste overlapped. The coloration in the bus bar portion was evaluated based on the following standard. The darker the amber color, the better the coloration in the bus bar portion.
1: A dark amber color.
2: A light amber color.
3: Yellow
4: Irregular coloration or a color other than those mentioned above, for example, blue, green, or white is observed.

TEST EXAMPLE 4
Resistance to Plating Solutions

Using the test pieces with which the coloration of the bus bar portion was evaluated, a copper film was formed onto the silver portion by an electrolytic plating method, and on top thereof, a nickel layer was additionally formed. The copper plating layer having the film thickness of 4–5 μm was obtained by electrolytic plating using an acid copper plating bath. The nickel plating layer having the film thickness of 1–2 μm was formed by electrolytic nickel plating using a Watt bath.

Then, on top of the plating layer, a U-shaped electrode terminal having a predetermined amount of solder thereon (Terminal No. 500, manufactured by Asahi Seisakusho Co., Ltd.) was soldered. The adhesive strength of the terminal was measured by using a tensile testing autograph (Product No. SD-100-C, manufactured by Shimadzu Corporation). Resistance to the plating solutions was evaluated based on the following criteria.
1: No strength degradation is observed.
2: Strength degradation of less than 5 kg is observed.
3: Strength degradation of 5 kg or greater and not exceeding 10 kg is observed.
4: Strength degradation of 10 kg or greater is observed.

The results of the above-described Test Examples 1–4 are shown in Tables 2–6 along with the ceramic color composition used in each test piece.

TABLE 2

|  | Example 1 | | Example 2 | |
| --- | --- | --- | --- | --- |
| Example No. | A-1 | B-1 | A-2 | B-2 |
| Type of glass | Zn based | Bi based | Zn based | Bi based |
| Glass components | crystal | amorphous | crystal | amorphous |
| $SiO_2$ | 43.0 | 35.0 | 44.0 | 36.0 |
| $B_2O_3$ | 4.5 | 5.0 | 6.0 | 4.0 |
| ZnO | 33.2 | — | 32.0 | — |
| $Bi_2O_3$ | — | 43.5 | — | 48.0 |
| $TiO_2$ | 4.0 | 6.0 | 5.0 | 3.0 |
| $Li_2O$ | 2.2 | 3.7 | 4.0 | 2.4 |
| $Na_2O$ | 5.5 | 2.5 | 4.0 | 5.1 |
| $K_2O$ | 3.0 | 1.3 | — | — |
| $ZrO_2$ | 2.6 | 3.0 | 3.0 | 1.5 |
| $V_2O_5$ | — | — | — | — |
| F | 2.0 | — | 2.0 | — |
| Ceramic color composition | | | | |
| First glass powder (A) | 64 | | 37 | |
| Second glass powder (B) | 10 | | 28 | |
| Inorganic pigment | 24 | | 30 | |
| Inorganic filler | 2 ($ZrO_2$) | | 5 ($Al_2O_3$) | |
| Property | | | | |
| Mold release property | B | | C | |
| Coloration in the bus bar portion | 1 | | 1 | |
| Acid resistance | 1 | | 1 | |
| Plating resistance | 2 | | 1 | |

TABLE 3

|  | Example 3 | | Example 4 | |
| --- | --- | --- | --- | --- |
| Example No. | A-3 | B-3 | A-4 | B-4 |
| Type of glass | Zn based | Bi based | Zn based | Bi based |
| Glass components | crystal | crystal | crystal | crystal |
| $SiO_2$ | 47.3 | 27.0 | 44.0 | 30.0 |
| $B_2O_3$ | 7.5 | 2.0 | 6.0 | 4.0 |
| ZnO | 28.0 | — | 32.0 | — |
| $Bi_2O_3$ | — | 61.0 | — | 58.0 |
| $TiO_2$ | 3.0 | 4.0 | 6.0 | 2.0 |

TABLE 3-continued

|  | Example 3 | | Example 4 | |
| --- | --- | --- | --- | --- |
| Example No. | A-3 | B-3 | A-4 | B-4 |
| Type of glass | Zn based | Bi based | Zn based | Bi based |
| Glass components | crystal | crystal | crystal | crystal |
| $Li_2O$ | 3.5 | 2.5 | 3.0 | 1.0 |
| $Na_2O$ | 4.2 | 1.0 | 4.0 | 2.0 |
| $K_2O$ | 1.0 | — | — | — |
| $ZrO_2$ | 2.0 | 2.5 | 3.0 | 3.0 |
| $V_2O_5$ | 2.0 | — | — | — |
| F | 1.5 | — | 2.0 | — |
| Ceramic color composition |  |  |  |  |
| First glass powder (A) | 10 | | 37 | |
| Second glass powder (B) | 65 | | 37 | |
| Inorganic pigment | 25 | | 26 | |
| Inorganic filler | — | | — | |
| Property |  |  |  |  |
| Mold release property | A | | A | |
| Coloration in the bus bar portion | 2 | | 1 | |
| Acid resistance | 1 | | 1 | |
| Plating resistance | 1 | | 2 | |

TABLE 4

|  | Example 5 | | Example 6 | |
| --- | --- | --- | --- | --- |
| Example No. | A-5 | B-5 | A-6 | B-3 |
| Type of glass | Zn based | Bi based | Zn based | Bi based |
| Glass components | crystal | crystal | amorphous | amorphous |
| $SiO_2$ | 46.0 | 27.0 | 37.0 | 27.0 |
| $B_2O_3$ | 3.0 | 2.0 | 8.0 | 2.0 |
| ZnO | 32.0 | — | 19.0 | — |
| $Bi_2O_3$ | — | 62.0 | — | 61.0 |
| $TiO_2$ | 5.0 | 3.0 | 9.0 | 4.0 |
| $Li_2O$ | 6.0 | 1.0 | 4.5 | 2.5 |
| $Na_2O$ | 3.5 | 2.5 | 7.5 | 1.0 |
| $K_2O$ | — | — | 3.5 | — |
| $ZrO_2$ | 2.0 | 1.5 | 4.5 | 2.5 |
| $V_2O_5$ | 1.5 | — | 4.0 | — |
| F | 1.0 | 1.0 | 3.0 | — |
| Ceramic color composition |  |  |  |  |
| First glass powder (A) | 62 | | 24 | |
| Second glass powder (B) | 8 | | 41 | |
| Inorganic pigment | 28 | | 35 | |
| Inorganic filler | 2 (ZnO) | | — | |
| Property |  |  |  |  |
| Mold release property | A | | C | |
| Coloration in the bus bar portion | 1 | | 1 | |
| Acid resistance | 1 | | 1 | |
| Plating resistance | 2 | | 1 | |

TABLE 5

|  | Comp. Exam. 1 | Comp. Exam. 2 | Comp. Exam. 3 | Comp. Exam. 4 |
| --- | --- | --- | --- | --- |
| Example No. | A-1 | B-2 | B-3 | B-5 |
| Type of glass | Zn based | Bi based | Bi based | Zn, Bi based |
| Glass components | crystal | amorphous | crystal | amorphous |
| $SiO_2$ | 43.0 | 36.0 | 27.0 | 37.0 |
| $B_2O_3$ | 4.5 | 4.0 | 2.0 | 5.0 |
| ZnO | 33.2 | — | — | 16.0 |
| $Bi_2O_3$ | — | 48.0 | 61.0 | 29.0 |
| $TiO_2$ | 4.0 | 3.0 | 4.0 | 4.0 |
| $Li_2O$ | 2.2 | 2.4 | 2.5 | 2.0 |
| $Na_2O$ | 5.5 | 5.1 | 1.0 | 3.0 |
| $K_2O$ | 3.0 | — | — | — |
| $ZrO_2$ | 2.6 | 1.5 | 2.5 | 3.0 |
| $V_2O_5$ | — | — | — | — |
| F | 2.0 | — | — | 1.0 |
| Ceramic color composition |  |  |  |  |
| First glass powder (A) | 70 | 0 | 0 | 62* |
| Second glass powder (B) | 0 | 72 | 72 |  |
| Inorganic pigment | 30 | 25 | 28 | 26 |
| Inorganic filler | — | 3 ($Al_2O_3$) | — | 2 (ZnO) |
| Property |  |  |  |  |
| Mold release property | B | E | A | D |
| Coloration in the bus bar portion | 1 | 3 | 4 | 2 |
| Acid resistance | 1 | 1 | 1 | 1 |
| Plating resistance | 4 | 1 | 1 | 1 |

*Indicates the compounding amount of B-5 glass.

TABLE 6

|  | Comp. Exam. 5 | | Comp. Exam. 6 | |
| --- | --- | --- | --- | --- |
| Example No. | A-1 | B-1 | A-3 | B-3 |
| Type of glass | Zn based | Bi based | Zn based | Bi based |
| Glass components | crystal | amorphous | crystal | crystal |
| $SiO_2$ | 43.0 | 35.0 | 47.3 | 27.0 |
| $B_2O_3$ | 4.5 | 5.0 | 7.5 | 2.0 |
| ZnO | 33.2 | — | 28.0 | — |
| $Bi_2O_3$ | — | 43.5 | — | 61.0 |
| $TiO_2$ | 4.0 | 6.0 | 3.0 | 4.0 |
| $Li_2O$ | 2.2 | 3.7 | 3.5 | 2.5 |
| $Na_2O$ | 5.5 | 2.5 | 4.2 | 1.0 |
| $K_2O$ | 3.0 | 1.3 | 1.0 | — |
| $ZrO_2$ | 2.6 | 3.0 | 2.0 | 2.5 |
| $V_2O_5$ | — | — | 2.0 | — |
| F | 2.0 | — | 1.5 | — |
| Ceramic color composition |  |  |  |  |
| First glass powder (A) | 73 | | 3 | |
| Second glass powder (B) | 2 | | 74 | |
| Inorganic pigment | 25 | | 23 | |
| Inorganic filler | — | | — | |
| Property |  |  |  |  |
| Mold release property | B | | A | |
| Coloration in the bus bar portion | 1 | | 4 | |
| Acid resistance | 1 | | 1 | |
| Plating resistance | 4 | | 1 | |

The above tables indicate the following facts. The ceramic color composition of the invention, which employs a lead-free glass mixture comprising 5–95 parts by weight of ZnO—SiO$_2$—B$_2$O$_3$ based glass powder and 5–95 parts by weight of Bi$_2$O$_3$—SiO$_2$—B$_2$O$_3$ based glass powder, at least one of such powders being crystalline glass, and which also contains an inorganic pigment, is greatly effective as a ceramic color composition that simultaneously satisfies the requirements of automobile window glass, such requirements including a mold release property, coloration in the bus bar portion, acid resistance, plating resistance, and the like.

INDUSTRIAL APPLICABILITY

The ceramic color composition of the present invention does not contain lead and exhibits an excellent mold release property in the hot molding process of a glass plate. The ceramic color composition is also excellent in acid resistance, coloration in a bus bar portion, plating resistance, etc., making it highly suitable for application to glass plates for use as automobile windows.

What is claimed is:

1. A ceramic color composition comprising, as a solid power, 50 to 90 wt. % of a mixture containing 5 to 95 parts by weight of a first lead-free glass powder comprising at least SiO$_2$, ZnO and B$_2$O$_3$ as glass components, and 5 to 95 parts by weight of a second lead-free glass powder comprising at least SiO$_2$, Bi$_2$O$_3$ and B$_2$O$_3$ as glass components, 10 to 40 wt. % of an inorganic pigment, and 0 to 10 wt. % of an inorganic filler, wherein the first glass powder and the second glass powder have the ratio of the components as described below:

| Ratio of the components of the first glass powder (wt.%) | |
|---|---|
| SiO$_2$ | 35–50 |
| B$_2$O$_3$ | 1–9 |
| ZnO | 15–40 |
| TiO$_2$ | 0.5–10 |
| Li$_2$O | 0.1–10 |
| Na$_2$O | 0.1–10 |
| F | 0–5 |
| K$_2$O | 0–10 |
| ZrO$_2$ | 0–5 |
| V$_2$O$_5$ | 0–5 |

| Ratio of the components of the second glass powder (wt.%) | |
|---|---|
| SiO$_2$ | 15–40 |
| B$_2$O$_3$ | 1–12 |
| Bi$_2$O$_3$ | 40–70 |
| TiO$_2$ | 1–10 |
| Li$_2$O | 0.1–10 |
| Na$_2$O | 0.1–10 |
| K$_2$O | 0–10 |
| ZrO$_2$ | 0–5 |
| V$_2$O$_5$ | 0–5 |
| F | 0–5. |

2. A ceramic color composition comprising, as a solid power, 50 to 90 wt. % of a mixture containing 5 to 95 parts by weight of a first lead-free glass powder comprising at least SiO$_2$, ZnO and B$_2$O$_3$ as glass components, and 5 to 95 parts by weight of a second lead-free glass powder comprising at least SiO$_2$, Bi$_2$O$_3$ and B$_2$O$_3$ as glass components, 10 to 40 wt. % of an inorganic pigment, and 0 to 10 wt. % of an inorganic filler, wherein at least one of the first glass powder and the second glass powder is crystalline, and wherein the first glass powder and the second glass powder have the ratio of the components as described below:

| Ratio of the components of the first glass powder (wt.%) | |
|---|---|
| SiO$_2$ | 35–50 |
| B$_2$O$_3$ | 1–9 |
| ZnO | 15–40 |
| TiO$_2$ | 0.5–10 |
| Li$_2$O | 0.1–10 |
| Na$_2$O | 0.1–10 |
| F | 0–5 |
| K$_2$O | 0–10 |
| ZrO$_2$ | 0–5 |
| V$_2$O$_5$ | 0–5 |

| Ratio of the components of the second glass powder (wt.%) | |
|---|---|
| SiO$_2$ | 15–40 |
| B$_2$O$_3$ | 1–12 |
| Bi$_2$O$_3$ | 40–70 |
| TiO$_2$ | 1–10 |
| Li$_2$O | 0.1–10 |
| Na$_2$O | 0.1–10 |
| K$_2$O | 0–10 |
| ZrO$_2$ | 0–5 |
| V$_2$O$_5$ | 0–5 |
| F | 0–5. |

3. The ceramic color composition according to claim 1, wherein the second glass powder is crystalline glass powder having the ratio of the components (wt. %) as described below:

| | |
|---|---|
| SiO$_2$ | 20–35 |
| B$_2$O$_3$ | 1–8 |
| Bi$_2$O$_3$ | 50–65 |
| TiO$_2$ | 1–10 |
| Li$_2$O | 0.1–10 |
| Na$_2$O | 0.1–10 |
| K$_2$O | 0–10 |
| ZrO$_2$ | 0–5 |
| V$_2$O$_5$ | 0–5 |
| F | 0–5. |

4. The ceramic color composition according to claim 2, wherein the second glass powder is crystalline glass powder having the ratio of the components (wt. %) as described below:

| | |
|---|---|
| SiO$_2$ | 20–35 |
| B$_2$O$_3$ | 1–8 |
| Bi$_2$O$_3$ | 50–65 |
| TiO$_2$ | 1–10 |
| Li$_2$O | 0.1–10 |
| Na$_2$O | 0.1–10 |
| K$_2$O | 0–10 |
| ZrO$_2$ | 0–5 |
| V$_2$O$_5$ | 0–5 |
| F | 0–5. |

5. A method for bending a glass plate comprising the steps of:
  printing a paste of the ceramic color composition of any one of claims 1, 2, 3, and 4 onto a glass plate;
  applying pressure to the glass plate with a mold under heat; and
  firing the paste and bending the glass plate at the same time.

6. A glass plate obtained by the method according to claim 5.

7. A glass plate according to claim 6 which is for use in automobile window glass.

* * * * *

UNITED STATES PATENT AND TRADEMARK OFFICE
CERTIFICATE OF CORRECTION

PATENT NO. : 6,905,990 B2
DATED : June 14, 2005
INVENTOR(S) : Shigehiro Sanichi and Yoshito Nokami It is certified that error appears in the above-identified patent and that said Letters Patent is hereby corrected as shown below:

<u>Title page,</u>
Insert Item -- [30] Foreign Application Priority Data
              June 29, 2000    (JP) ............... 2000-196666 --.

Signed and Sealed this

Eighth Day of November, 2005

JON W. DUDAS
*Director of the United States Patent and Trademark Office*